US011780357B2

(12) United States Patent
Kim et al.

(10) Patent No.: US 11,780,357 B2
(45) Date of Patent: Oct. 10, 2023

(54) VEHICLE CUP HOLDER ALLOWING WIRELESS CHARGING

(71) Applicant: AMOSENSE CO., LTD., Cheonan-si (KR)

(72) Inventors: Chol Han Kim, Incheon (KR); Bo Hyeon Han, Goyang-si (KR); Bong Sik Woo, Gimpo-si (KR); Bae Geun Lee, Suwon-si (KR)

(73) Assignee: Amosense Co., Ltd., Cheonan-Si (KR)

( * ) Notice: Subject to any disclaimer, the term of this patent is extended or adjusted under 35 U.S.C. 154(b) by 511 days.

(21) Appl. No.: 17/261,098

(22) PCT Filed: Jul. 19, 2019

(86) PCT No.: PCT/KR2019/008979
§ 371 (c)(1),
(2) Date: Jan. 18, 2021

(87) PCT Pub. No.: WO2020/017935
PCT Pub. Date: Jan. 23, 2020

(65) Prior Publication Data
US 2021/0316649 A1 Oct. 14, 2021

(30) Foreign Application Priority Data

Jul. 20, 2018 (KR) .................. 10-2018-0084793
Oct. 19, 2018 (KR) .................. 10-2018-0125253
Jul. 19, 2019 (KR) .................. 10-2019-0087664

(51) Int. Cl.
*B60N 3/10* (2006.01)
*H02J 50/10* (2016.01)
(Continued)

(52) U.S. Cl.
CPC .............. *B60N 3/101* (2013.01); *B60N 3/10* (2013.01); *B60N 3/105* (2013.01); *B60R 16/03* (2013.01);
(Continued)

(58) Field of Classification Search
CPC .......... B60N 3/10; B60N 3/101; B60N 3/104; B60N 3/105; B60R 16/02; B60R 16/03;
(Continued)

(56) References Cited

U.S. PATENT DOCUMENTS 8,541,974 B2 * 9/2013 Farahani .............. H02J 7/0044
320/108
2018/0152033 A1 5/2018 Dalsoo

FOREIGN PATENT DOCUMENTS

JP 2010-235066 A 10/2010
KR 10-2014-0045126 A 4/2014
(Continued)

OTHER PUBLICATIONS

International Search Report cited in PCT/KR2019/008979 dated Nov. 6, 2019, 2 pages.

*Primary Examiner* — Dennis H Pedder
(74) *Attorney, Agent, or Firm* — Rothwell, Figg, Ernst & Manbeck, P.C.

(57) ABSTRACT

Provided is a vehicle cup holder allowing wireless charging. A vehicle cup holder allowing wireless charging according to an embodiment of the present invention comprises: a housing having an accommodation space for accommodating objects, including a portable telephone; a support unit coupled to the housing by means of a rotational shaft to allow rotation in the accommodation space, and comprising a wireless transmission module for wirelessly charging the battery of a portable telephone; a sensing unit for sensing input signals from a user or the proximity of a portable (Continued)

telephone; and a driving unit for providing driving power to the rotational shaft so as to allow the position of the support unit to be changed, on the basis of a signal sensed by the sensing unit, to a charging position in which the portable telephone can be charged, or to a standby position in which an object can be accommodated in the accommodation space.

11 Claims, 15 Drawing Sheets

(51) Int. Cl.
*B60R 16/03* (2006.01)
*H02J 7/02* (2016.01)
*H02J 50/12* (2016.01)
*H02J 50/70* (2016.01)
*B60R 11/02* (2006.01)

(52) U.S. Cl.
CPC ................ *H02J 7/02* (2013.01); *H02J 50/10* (2016.02); *H02J 50/12* (2016.02); *B60R 11/0241* (2013.01); *H02J 50/70* (2016.02)

(58) Field of Classification Search
CPC .. H02J 7/044; H02J 5/402; H02J 50/10; H02J 50/23
USPC ........................ 296/24.34, 37.8, 37.12–37.15
See application file for complete search history.

(56) References Cited

FOREIGN PATENT DOCUMENTS

| | | |
|---|---|---|
| KR | 10-2014-0091266 A | 7/2014 |
| KR | 10-1461101 B | 11/2014 |
| KR | 10-2015-0033305 A | 4/2015 |
| KR | 10-2015-0063821 A | 6/2015 |
| KR | 10-2015-0084210 A | 7/2015 |
| KR | 10-1665247 B1 | 10/2016 |
| KR | 10-2016-0146478 A | 12/2016 |
| KR | 10-2017-0020058 A | 2/2017 |
| KR | 10-2017-0028137 A | 3/2017 |
| KR | 10-1845832 B1 | 4/2018 |
| WO | 2016-056793 A1 | 4/2016 |

* cited by examiner

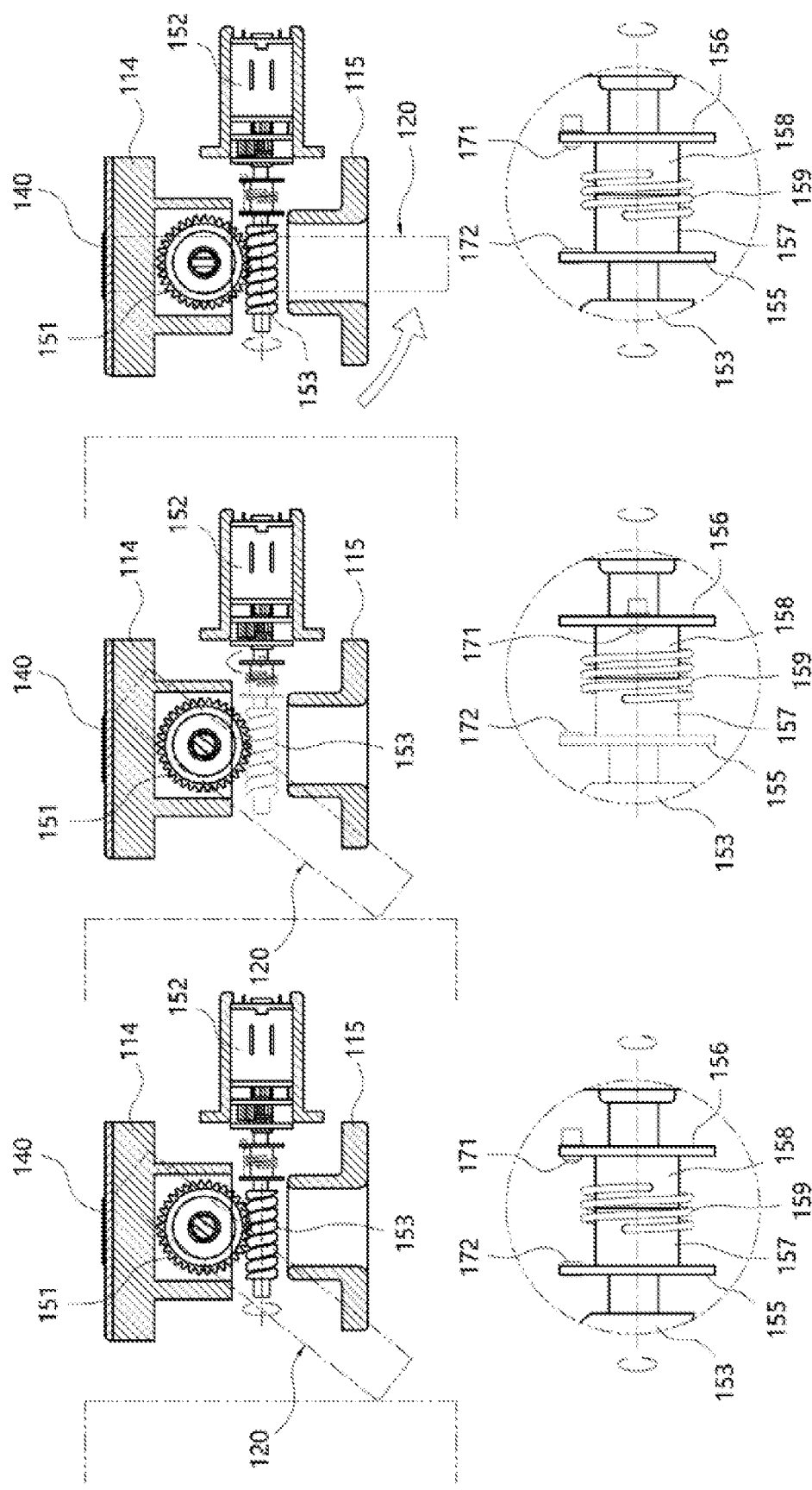

VEHICLE CUP HOLDER ALLOWING WIRELESS CHARGING

CROSS REFERENCE TO RELATED APPLICATION

This application is a 35 U.S.C. 371 National Phase Entry Application from PCT/KR2019/008979, filed Jul. 19, 2019, which claims the benefit of Korean Patent Application No. 10-2018-0084793 filed on Jul. 20, 2018; Korean Patent Application No. 10-2018-0125253 filed Oct. 19, 2018 and Korean Patent Application No. 10-2019-0087664 filed Jul. 19, 2019, the disclosures of which are incorporated herein in their entirety by reference.

TECHNICAL FIELD

The present invention relates to a vehicle cup holder, and more particularly, to a vehicle cup holder allowing wireless charging.

BACKGROUND

Recently, with the increase in the spread of portable terminals to which embedded batteries are applied, various types of chargers for charging portable terminals in vehicles are being sold.

In general, a vehicle provides a universal serial bus (USB) port for connecting a charging cable, and a portable terminal is connected to the USB port through the charging cable to charge a battery.

However, a charging structure using a charging cable has a problem in that changing efficiency is degraded due to the abrasion of a charging port of a portable terminal caused by the connection, disconnection of the charging cable or the introduction of foreign materials into the charging port, or the like.

Recently, in order to solve a problem of a charging structure using a charging cable, technology for wirelessly charging a battery of a portable terminal through wireless power transmission has been developed.

As a part of the wireless power transmission, a wireless charging device in the form that is inserted into a vehicle cup holder has been developed, but there is a problem in that a space for mounting an actual cup is insufficient due to a structure in which the wireless charging device in the form of a cup is inserted into the cup holder.

SUMMARY OF THE INVENTION

The present invention is directed to providing a vehicle cup holder allowing wireless charging, which performs additionally has a charging function capable of wirelessly charging a battery of a portable terminal as well as an original function as a cup holder of accommodating an object.

The present invention is also directed to providing a vehicle cup holder in which, when a user intends to charge a battery of a portable terminal in an accommodation space, a mounting unit may be automatically shifted to a charging position at which the portable terminal may be mounted.

The present invention is also directed to providing a vehicle cup holder allowing wireless charging which is capable of supplying wireless power to an object capable of receiving wireless power other than a portable terminal.

One aspect of the present invention provides a vehicle cup holder allowing wireless charging including a housing which has an accommodation space, in which an object including a portable terminal is accommodated, formed therein, a mounting unit which is coupled to the housing through a rotation shaft so as to be rotatable in the accommodation space and which includes a wireless power transmission module configured to wirelessly charge a battery of the portable terminal, a sensing unit which detects an input signal of a user or detects proximity of the portable terminal, and a driving unit which provides a driving force to the rotation shaft based on a signal detected by the sensing unit such that the mounting unit is shifted to a charging position at which a battery of the portable terminal is charged or a standby position at which the object is accommodated in the accommodation space.

The charging position may be a position at which one surface of the mounting unit is disposed to be inclined at an acute angle with respect to a bottom surface or a side surface of the accommodation space so as to support one surface of the portable terminal, and the standby position may be a position at which the one surface of the mounting unit is disposed in a state parallel to the side surface of the accommodation space.

When the battery of the portable terminal is not charged at the charging position for a predetermined time, the mounting unit may be shifted to the standby position.

The sensing unit may be a proximity sensor configured to detect a user's movement or a touch sensor configured to detect a user's touch. The sensing unit may be disposed in the housing so as to be positioned outside the accommodation space and may be disposed so as to not be disposed directly over the mounting unit.

The sensing unit may be a near field communication (NFC) antenna embedded in the mounting unit to recognize an NFC signal transmitted from the portable terminal.

The rotation shaft may include a first rotation shaft and a second rotation shaft which protrude outward from both sides of the mounting unit by a predetermined length, and the driving unit may include a driven gear axially coupled to the first rotation shaft, a driving motor mounted in the housing, and a drive gear axially coupled to the driving motor and engaged with the driven gear.

The driven gear may be a worm wheel, and the drive gear may be a worm. In addition, all known gear types such as a bevel gear, a helical gear, a rack and pinion gear or the like may be applied as the driven gear and the drive gear.

The vehicle cup holder may further include a malfunction prevention unit configured to shift the mounting unit to the standby position by detecting a state in which the object is accommodated in the accommodation space when the mounting unit is rotated from the standby position to the charging position.

The driving unit may further include a first member axially coupled to a rotation shaft of the driving motor, a second member axially coupled to the drive gear and having an opposite surface facing the first member, a first joint member disposed between the first member and the second member and axially coupled to the rotation shaft of the driving motor, a second joint member disposed between the first member and the second member and axially coupled to the drive gear, and a spring member of which one end portion is fixed to the first joint member, and the other end portion is fixed to the second joint member, and which is disposed to surround circumferential surfaces of the first joint member and the second joint member, and the malfunction prevention unit may include a Hall sensor mounted on one surface of the first member and a magnet member mounted on one surface of the second member.

In a case in which an overcurrent is applied to the driving motor when the mounting unit is rotated from the standby position to the charging position, the mounting unit may be shifted to the standby position.

The mounting unit may include a case having an interior space in which the wireless power transmission module is disposed, and a connection board disposed in the interior space and electrically connected to the wireless power transmission module, the rotation shaft may have a through-hole formed to pass therethrough in a length direction thereof, and the connection board may include a first part disposed in the interior space and a second part disposed to pass through the through-hole such that a portion thereof is exposed to the outside and a cable is connected thereto.

The mounting unit may include at least one protrusion protruding from an inner surface of the case so as to support one surface of the wireless power transmission module.

The vehicle cup holder may further include another wireless power transmission module embedded in a bottom surface of the accommodation space, wherein, in a state in which the mounting unit maintains the standby position, the another wireless power transmission module may transmit wireless power to the object inserted into the accommodation space.

Advantageous Effects

According to the present invention, since a mounting unit capable of charging a battery of a portable terminal is automatically rotated through driving of a driving unit, it is possible to smoothly perform both of an original function (first function) of a cup holder of accommodating an object such as a cup or a tumbler and a second function of wirelessly charging the battery of the portable terminal.

BRIEF DESCRIPTION OF THE DRAWINGS

FIGS. 15A-15C show an operating state view illustrating a process in which the mounting unit returns to the standby position through a malfunction sensing unit in the vehicle cup holder allowing wireless charging according to one embodiment of the present invention.

DETAILED DESCRIPTION

Figure 1:
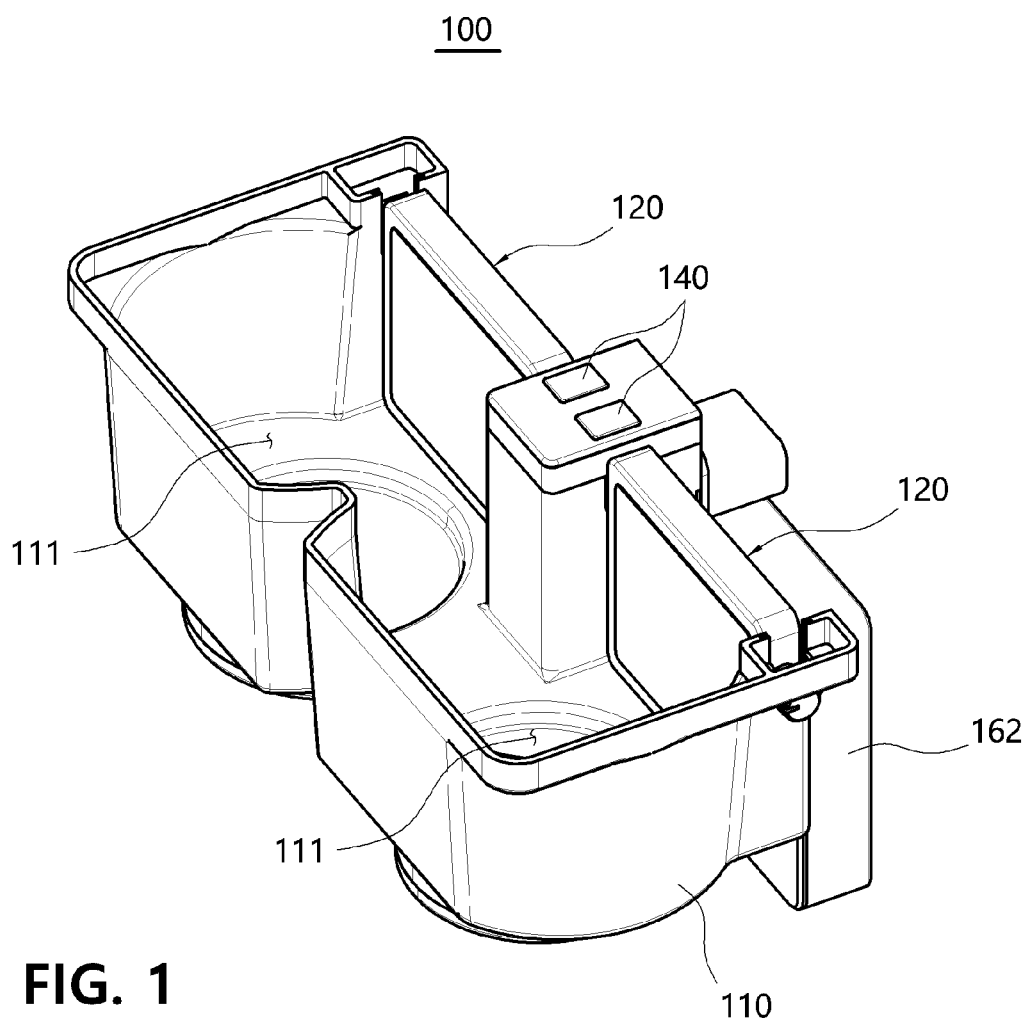
FIG. 1 is a view illustrating a vehicle cup holder allowing wireless charging according to one embodiment of the present invention.

Hereinafter, embodiments of the present invention will be described in detail with reference to the accompanying drawings so as to be easily practiced by a person of ordinary skill in the art to which the present invention pertains. It should be understood that the present invention may be embodied in various different forms and is not limited to the following embodiments. Any redundant descriptions of well-know parts will be omitted in drawings for clarity, and like reference numerals refer to like elements throughout the specification.

Figure 3:
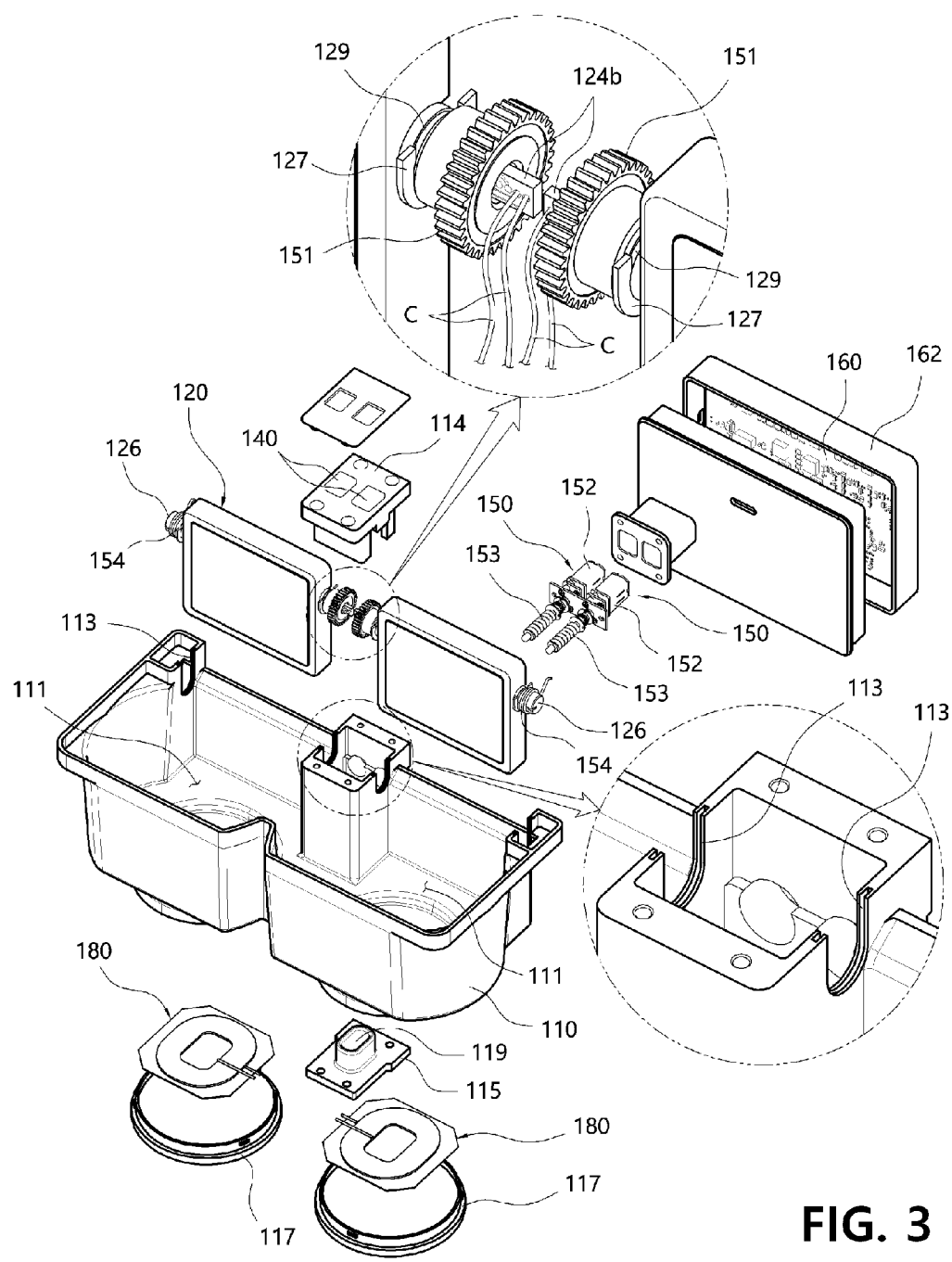
FIG. 3 is an exploded view of FIG. 1.

A vehicle cup holder 100 (hereinafter, referred to as "cup holder") allowing wireless charging according to one embodiment of the present invention includes a housing 110, a mounting unit 120, a sensing unit 140 or 240, and a driving unit 150 as shown in FIGS. 1 and 3.

The housing 110 may include one or more first accommodation spaces 111 for accommodating an object including a portable terminal 10. That is, the one or more first accommodation spaces 111 may be formed to be recessed downward from an upper surface of the housing 110 by a predetermined depth, and an upper portion thereof may be open.

Figure 2:
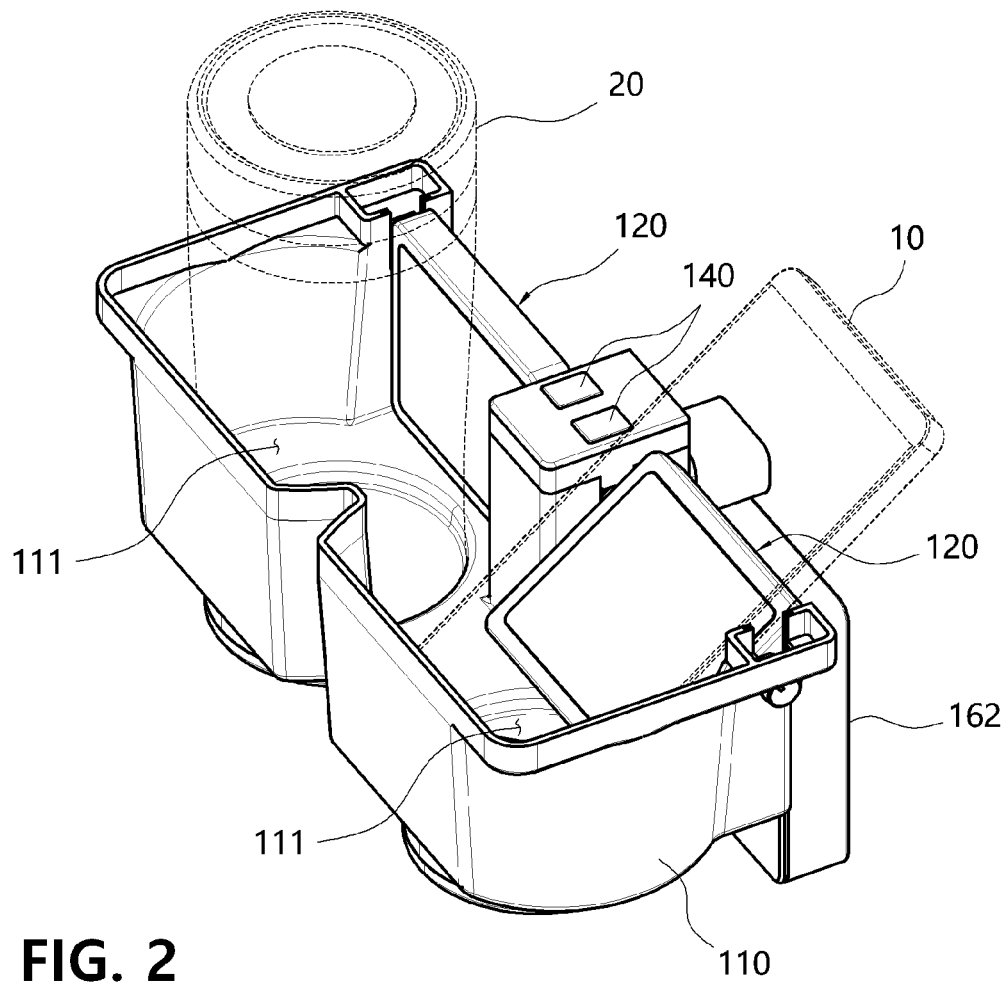
FIG. 2 is a use state view of FIG. 1.

Accordingly, as shown in FIG. 2, the object may be introduced through the open upper portion of the first accommodation space 111 and accommodated in the first accommodation space 111.

Two first accommodation spaces 111 may be provided so as to be adjacent to each other in one direction of the housing 110. However, the total number of the first accommodation spaces 111 is not limited thereto, and the total number of the first accommodation spaces 111 may be appropriately changed.

Here, the object may be a portable object such as the portable terminal 10, a cup, or a tumbler 20 or may be various objects that can be accommodated in a well-known vehicle cup holder. In addition, the cup may be a container such as a general paper cup, a plastic cup, or a tumbler that can hold a liquid such as water or coffee.

The mounting unit 120 may be formed in a plate shape having a predetermined area and may be disposed in the first accommodation space 111. The mounting unit 120 may be coupled to the housing 110 so as to be rotatable in the first accommodation space 111.

Figure 14A:
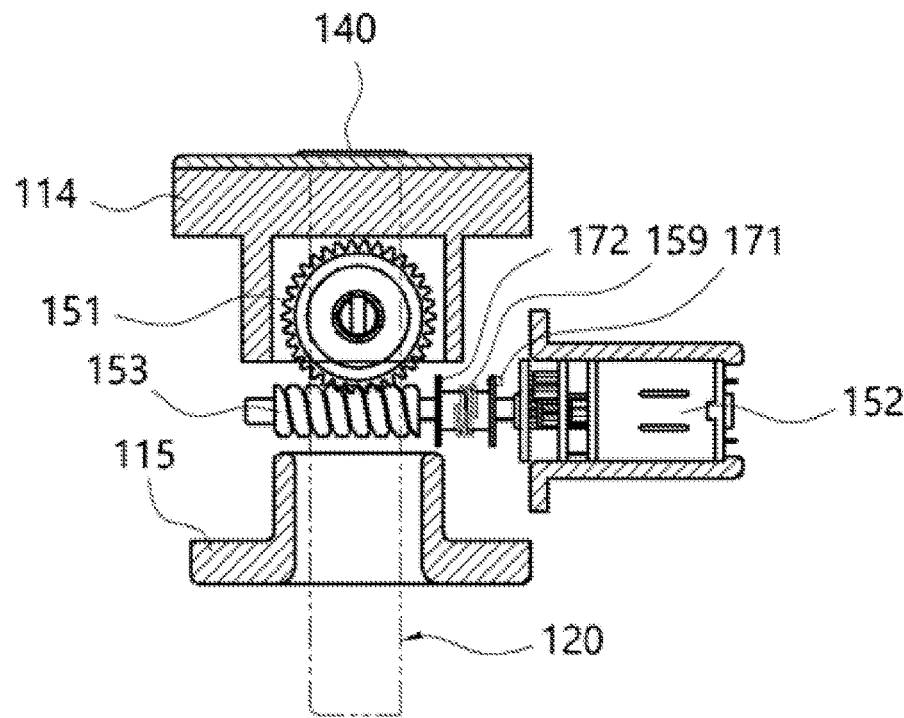
FIGS. 14A-14B show an operating state view illustrating a process in which the mounting unit is shifted from a standby position to a charging position in the vehicle cup holder allowing wireless charging according to one embodiment of the present invention.
Figure 14B:
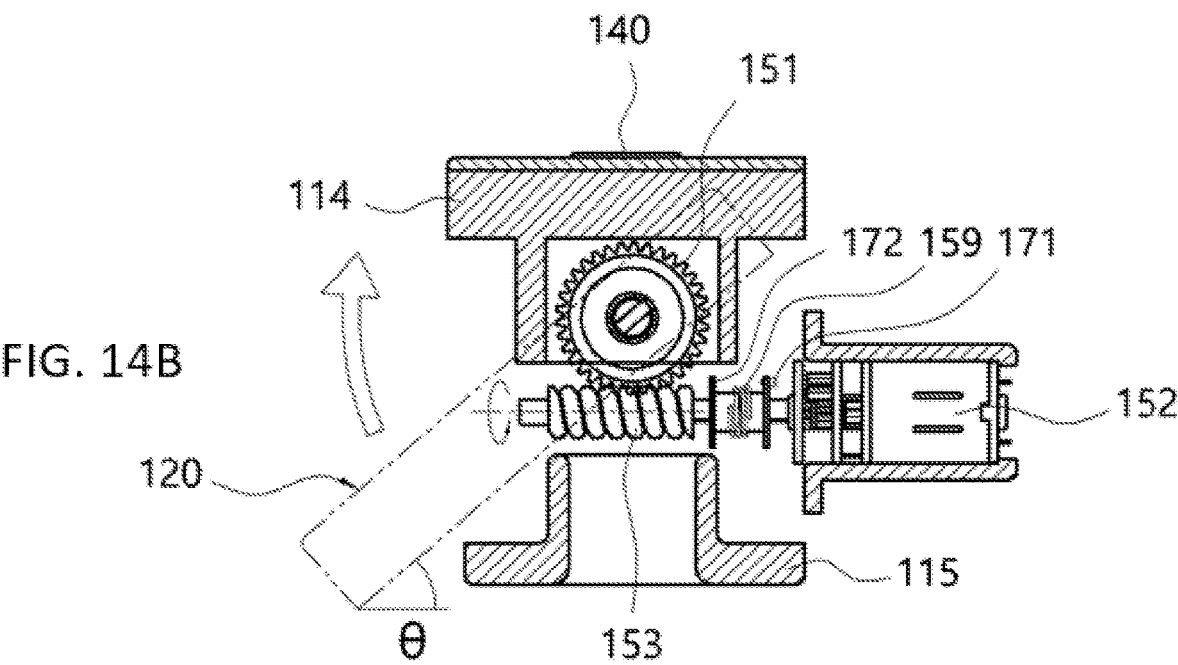

Thus, as shown in FIGS. 2 and 14A-14B, the mounting unit 120 may be shifted to a charging position at which one surface thereof is inclined and disposed to form an acute angle θ (for example, 55 degrees) with a bottom surface or side surface of the first accommodation space 111 or may be shifted to a standby position at which one surface thereof is disposed to be parallel to and face the side surface of the first accommodation space 111. Here, the standby position may correspond to a state in which one surface of the mounting unit 120 is perpendicular to the bottom surface of the first accommodation space 111.

Accordingly, in the cup holder 100 according to one embodiment of the present invention, when the mounting unit 120 maintains a state of being shifted to the charging position in the first accommodation space 111, the mounting unit 120 may support one surface of an object such as a portable terminal.

Figure 12:
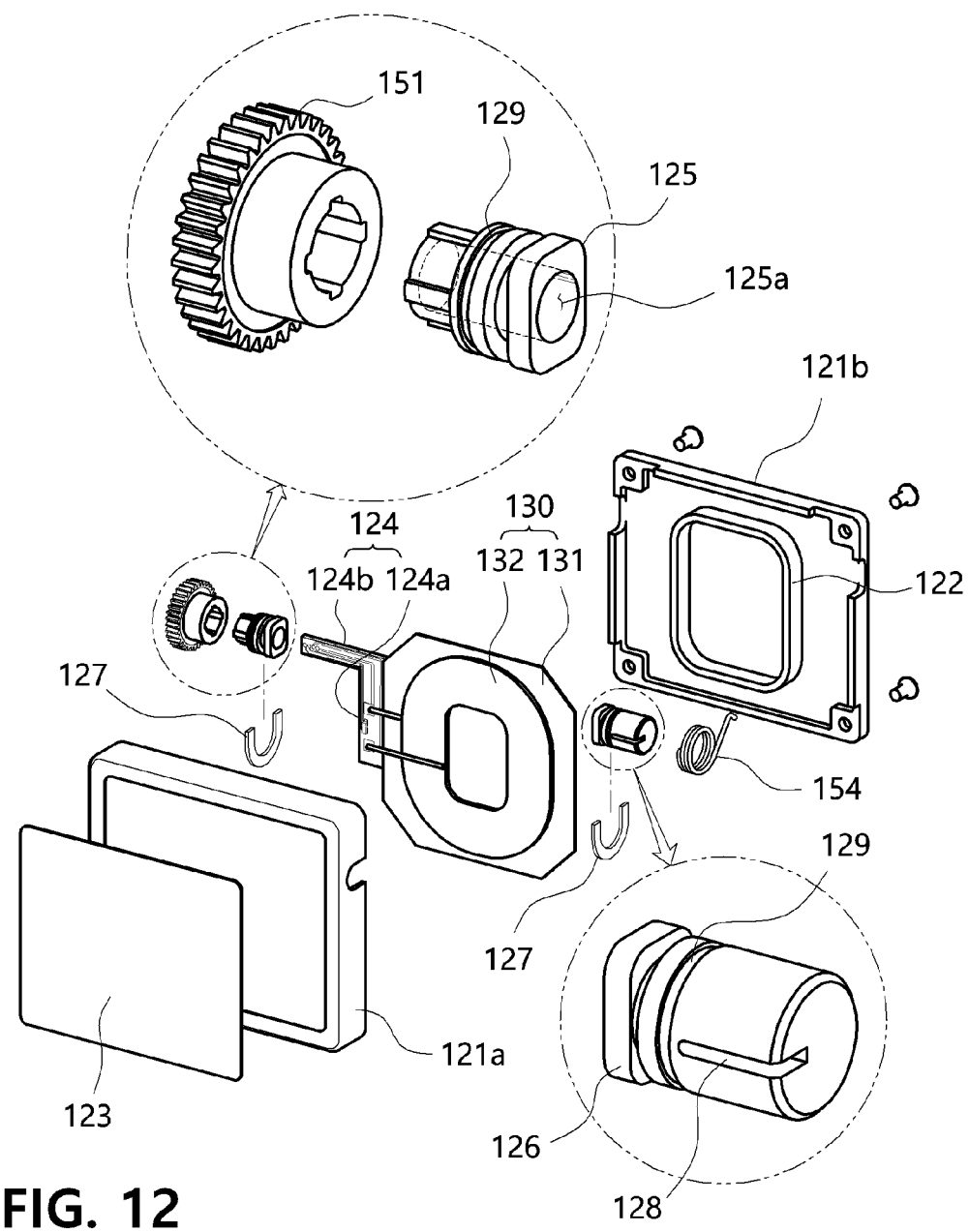
FIG. 12 is an exploded view of FIGS. 11A-11B.
Figure 13:
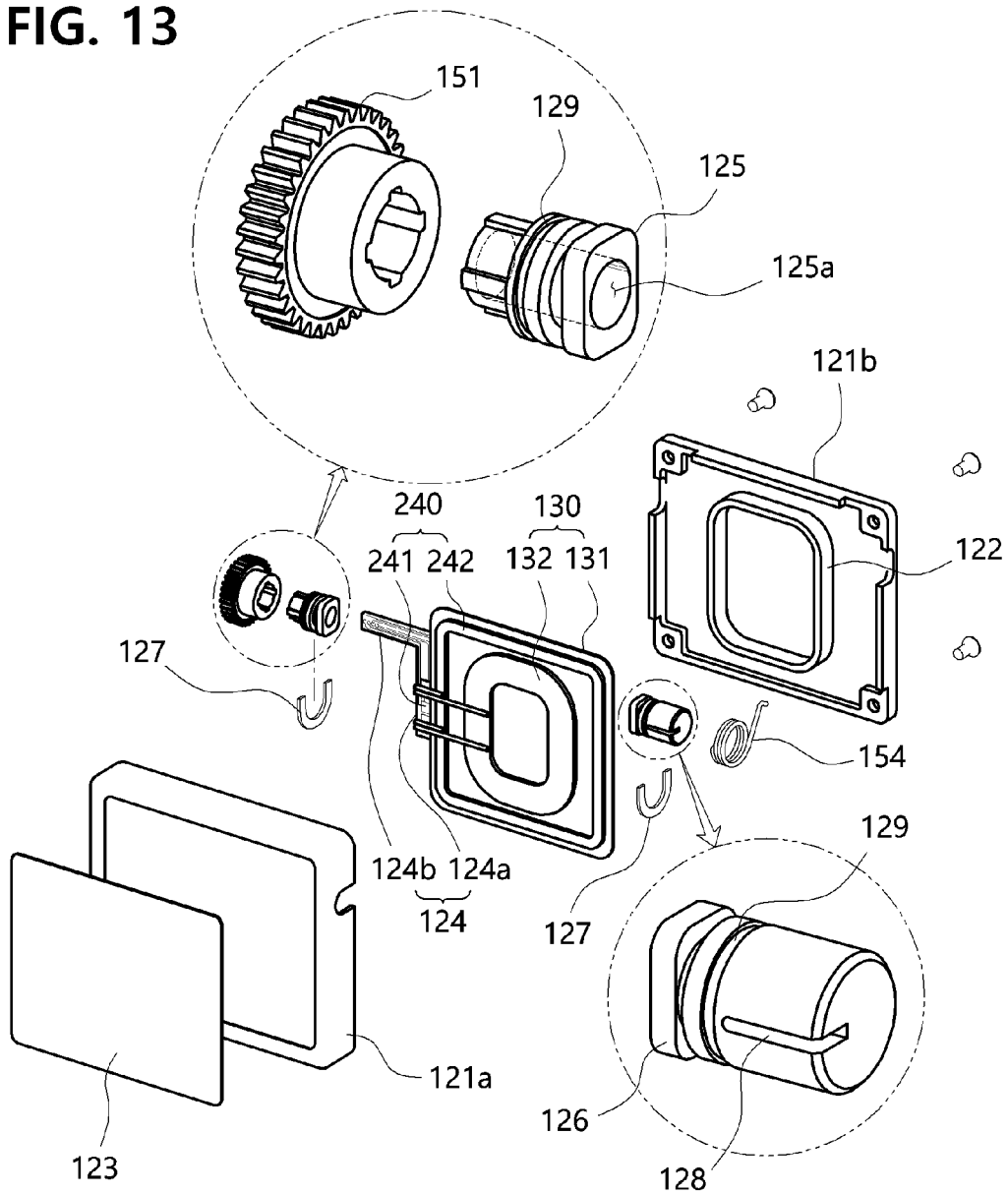
FIG. 13 is an exploded view of the mounting unit illustrating another type of a sensing unit applicable to the vehicle cup holder allowing wireless charging according to one embodiment of the present invention.

Here, as shown in FIGS. 12 and 13, a slip prevention pad 123 may be provided on one surface of the mounting unit 120. Thus, when the mounting unit 120 mounts an object in a state of being shifted to the charging position, the object mounted on the mounting unit 120 may have an increased frictional force through contact with the slip prevention pad 123, thereby being prevented from slipping or being moved. Accordingly, the mounting unit 120 may stably mount the object.

In addition, in the cup holder 100 according to one embodiment of the present invention, when the mounting unit 120 maintains a state of being shifted to the standby position in the first accommodation space 111, the first accommodation space 111 may secure enough space to accommodate an object.

Thus, the cup holder 100 according to one embodiment of the present invention may perform an original function (first function) as a holder to accommodate a cup, a tumbler, or the like in the first accommodation space 111.

To this end, the mounting unit 120 may include one pair of rotation shafts 126 and 127 formed to protrude from both sides thereof, and the mounting unit 120 may be rotatably coupled to the housing 110 through the one pair of rotation shafts 126 and 127.

Here, the one pair of rotation shafts 126 and 127 may be integrally formed with the mounting unit 120 or may be detachably coupled to the mounting unit 120.

Figure 4:
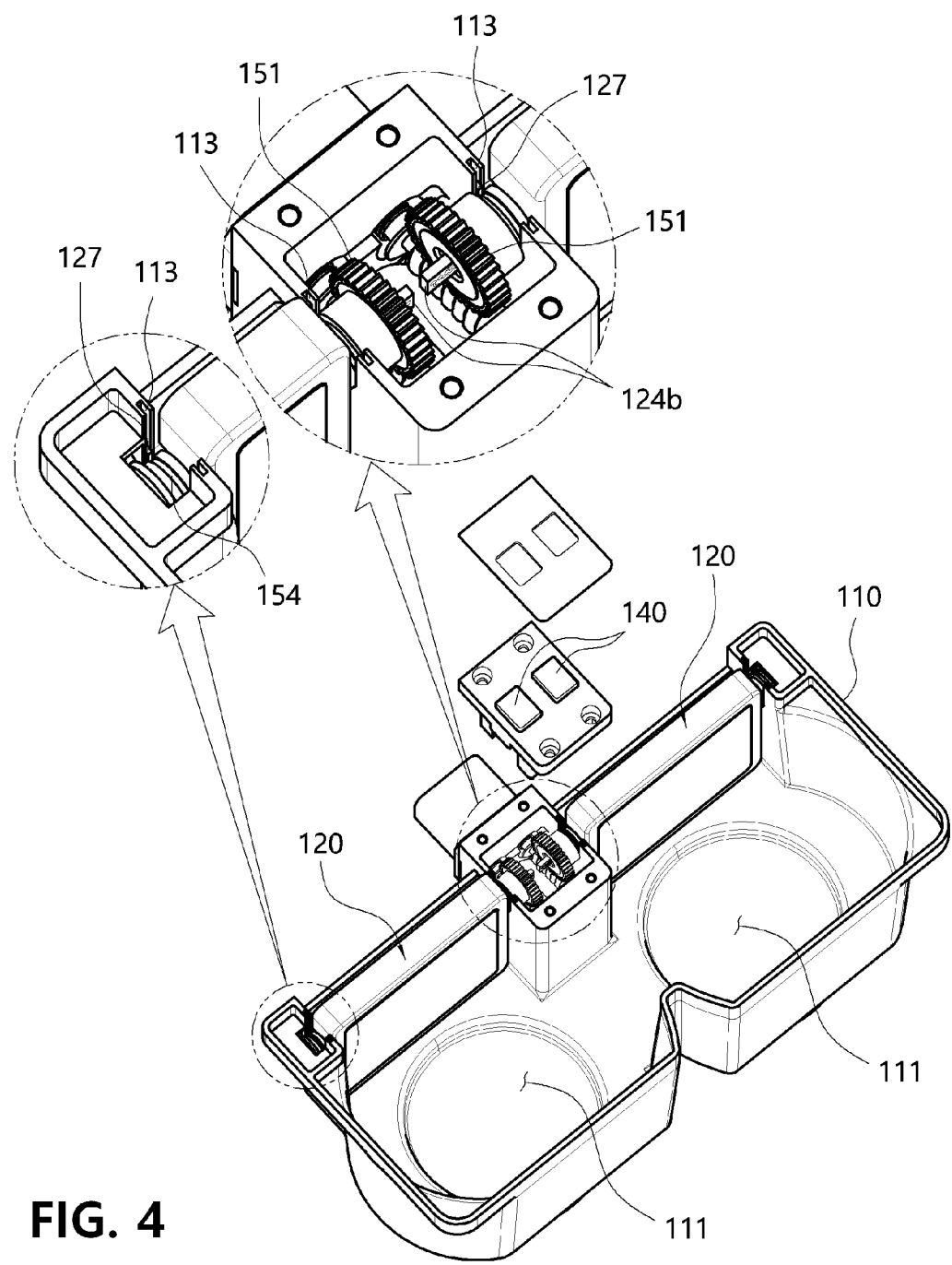
FIG. 4 is a view illustrating a state in which a holder member is separated in FIG. 1.

Specifically, as shown in FIGS. 3 and 4, the one pair of rotation shafts 126 and 127 may include a first rotation shaft 125 and a second rotation shaft 126, and the first rotation shaft 125 and the second rotation shaft 126 may be rotatably coupled to the housing 110.

In this case, the housing 110 may include a plurality of locking grooves 113 for accommodating a portion of the first rotation shaft 125 and a portion of the second rotation shaft 126, and the first rotation shaft 125 and the second rotation shaft 126 may be latched and installed in the plurality of locking grooves 113.

Thus, when the first rotation shaft 125 and the second rotation shaft 126 are rotated, the mounting unit 120 may be rotated about the first rotation shaft 125 and the second rotation shaft 126 in the same direction as a rotation direction of the first rotation shaft 125 and the second rotation shaft 126.

As an example, the plurality of locking grooves 113 may be formed in the housing 110 and may be formed to communicate with the first accommodation space 111.

As a non-limiting example, as shown in FIG. 3, the plurality of locking grooves 113 may be formed to be recessed downward from the upper surface of the housing 110 by a predetermined depth and may have an upper portion that is open like an approximately "U" shape.

Thus, as shown in FIG. 4, partial lengths of the first rotation shaft 125 and the second rotation shaft 126 protruding from the mounting unit 120 may be latched and installed in the locking grooves 113 corresponding thereto, and the first rotation shaft 125 and the second rotation shaft 126 may be rotated in the locking grooves 113.

In this case, in the cup holder 100 according to one embodiment of the present invention, in order to minimize a load generated in the first rotation shaft 125 and the second rotation shaft 142 when the mounting unit 120 is rotated, the first rotation shaft 125 and the second rotation shaft 142 may be latched and installed in the locking grooves 113.

To this end, as shown in FIG. 4, a sleeve ring 127 may be installed in each of the plurality of locking grooves 113, and the sleeve ring 127 may be installed in the locking groove 113 so as to partially protrude inside the locking groove 113 by a predetermined length along the locking groove 113.

As an example, the sleeve ring 127 may include an opening with one side that is open like an approximately "U" shape and may be formed as a thin plate. In this case, the sleeve ring 127 may be installed in the locking groove 113 such that an inner surface of the sleeve ring 127 protrudes inside the locking groove 113 by a predetermined length.

Accordingly, in a state in which the sleeve ring 127 is installed in the locking groove 113, when partial lengths of the first rotation shaft 125 and the second rotation shaft 142 protruding from the mounting unit 120 are inserted into the locking grooves 113, a circumference surface of each of the first rotation shaft 125 and the second rotation shaft 142 may be partially supported directly by the inner surface of the sleeve ring 127 protruding inside the locking groove 113.

Accordingly, it is possible to minimize a contact area of the first rotation shaft 125 and the second rotation shaft 142 in contact with the sleeve ring 127. Accordingly, when the first rotation shaft 125 and the second rotation shaft 142 are rotated by an external force, a load generated in the first rotation shaft 125 and the second rotation shaft 142 can be minimized, and even when a minimum external force is applied, the first rotation shaft 125 and the second rotation shaft 142 can be smoothly rotated. Thus, the mounting unit 120 can be smoothly rotated around the first rotation shaft 125 and the second rotation shaft 126.

In this case, as shown in FIGS. 12 and 13, the first rotation shaft 125 and the second rotation shaft 142 may include seating grooves 129 that are formed to be recessed at longitudinal middles in a circumferential direction thereof. In this case, the first rotation shaft 125 and the second rotation shaft 142 may be latched and installed in the sleeve rings 127 through the seating grooves 129.

Thus, in the cup holder 100 according to one embodiment of the present invention, the first rotation shaft 125 and the second rotation shaft 142 can be prevented from being moved when the mounting unit 120 is rotated. Accordingly, in the cup holder 100 according to one embodiment of the present invention, the mounting unit 120 may be stably rotated around the first rotation shaft 125 and the second rotation shaft 142.

Figure 9:
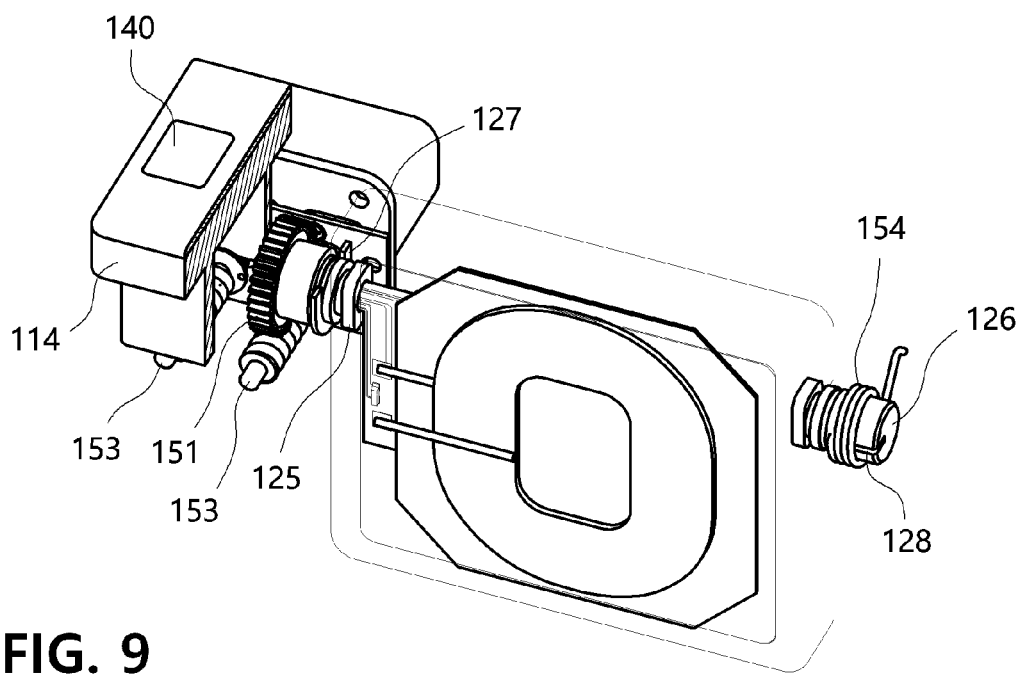
FIG. 9 is a view illustrating a coupling relationship between a first rotation shaft, a drive gear, and a driven gear in the vehicle cup holder allowing wireless charging according to one embodiment of the present invention.

In this case, in the cup holder 100 according to one embodiment of the present invention, as shown in FIG. 9, the mounting units 120 may include first wireless power transmission modules 130 for wirelessly charging a battery of the portable terminal 10. In this case, the first wireless power transmission module 130 may be electrically connected to a circuit board 160.

In the present invention, a controller for controlling driving of the first wireless power transmission module 130 may be mounted on the circuit board 160, the sensing unit 140 or 240, and the driving unit 150. In addition, the circuit board 160 may receive driving power from a battery of a vehicle.

Meanwhile, as shown in FIG. 3, the circuit board 160 may be provided separately from the housing 110, and an appropriate number of the circuit boards 160 may be used according to the numbers and installation positions of the first wireless power transmission modules 130, the sensing unit 140 or 240, and the driving unit 150.

In addition, the circuit board 160 may be embedded in a housing-shaped cover 162 so as to be prevented from being exposed to the outside. In this case, the cover 162 may be fixed to one side of the housing 110 or may be fixed to another member. However, the arrangement position of the circuit board 160 is not limited thereto and may be appropriately changed according to design conditions.

Thus, in the cup holder 100 according to one embodiment of the present invention, in a state in which the mounting unit 120 is shifted to the charging position in the first accommodation space 111, when the portable terminal 10 is mounted such that one surface thereof is in contact with one surface of the mounting unit 120, the battery of the portable terminal 10 may be charged using wireless power supplied from the first wireless power transmission module 130.

Accordingly, the cup holder 100 according to one embodiment of the present invention may implement both of the first function as a holder capable of accommodating a cup, a tumbler, or the like in the first accommodation space 111 and a second function as a wireless charger capable of wirelessly charging a battery of a portable terminal.

Meanwhile, the first wireless power transmission module 130 may be embedded in the mounting unit 120. In addition, when the plurality of mounting units 120 are provided, the first wireless power transmission module 130 may be provided separately in each of the plurality of mounting units 120.

To this end, the mounting unit 120 may include cases 121a and 121b for accommodating the first wireless power transmission module 130.

As an example, as shown in FIGS. 12 and 13, the cases 121a and 121b may include a first case 121a and a second case 121b that are detachably coupled to each other, and the first wireless power transmission module 130 may be accommodated in an interior space formed through the first case 121a and the second case 121b.

Here, the first wireless power transmission module 130 may include a shielding sheet 131 and a wireless power transmission antenna 132 disposed on one surface of the shielding sheet 131. In addition, the shielding sheet 131 may be a magnetic sheet so as to shield a magnetic field generated from the wireless power transmission antenna 132, and the wireless power transmission antenna 132 may be a flat coil. Since the shielding sheet 131 and the wireless power transmission antenna 132 are well known, detailed descriptions thereof will be omitted.

In this case, at least one protrusion 122 for supporting one surface of the shielding sheet 131 may be formed in the case.

As an example, the at least one protrusion 122 may be formed to protrude from an inner surface of the second case 121b. Thus, when the first wireless power transmission module 130 is disposed inside the case, the wireless power transmission antenna 132 may maintain a state of being pressed against an inner surface of the first case 121a, and the first wireless power transmission module 130 may not be moved inside the case.

Accordingly, when one surface of a portable terminal is pressed against one surface of the mounting unit 120, in detail, an outer surface of the first case 121a, it is possible to minimize a spacing distance between the portable terminal and the wireless power transmission antenna 132 embedded in the mounting unit 120, and even when shaking occurs during driving of a vehicle, it is possible to prevent a change in position of the first wireless power transmission module 130 embedded in the mounting unit 120 due to the shaking of the vehicle.

Thus, in the cup holder 100 according to one embodiment of the present invention, since power transmission can be smoothly performed even when shaking occurs during driving of a vehicle, wireless charging can be stably performed.

Accordingly, when one surface of the portable terminal is disposed in a state of being pressed against one surface of the mounting unit 120, a battery of the portable terminal can be smoothly charged using wireless power transmitted from the first wireless power transmission module 130.

Alternatively, the first wireless power transmission module 130 may be attached to one surface of the mounting unit 120 or may be coupled to one surface of the mounting unit 120 in a state accommodated in another member.

Meanwhile, when the plurality of first accommodation spaces 111 are provided, the mounting unit 120 may be disposed separately in each of the plurality of first accommodation spaces 111.

As a non-limiting example, one mounting unit 120 may be disposed on one side surface positioned in a direction of a driver seat of side surfaces of the first accommodation space 111, and the other mounting unit 120 may be disposed on one side surface positioned in a direction of a passenger seat of side surfaces of another first accommodation space 111.

In this case, as shown in FIGS. 1 to 4, the mounting units 120 disposed in the first accommodation spaces 111 may be rotatably coupled to the same side surfaces of the first accommodation spaces 111.

Although the drawings illustrate that the mounting units 120 are respectively installed in the two first accommodation spaces 111 and the two mounting units 120 are disposed side by side on the same side surfaces of the side surfaces of the first accommodation spaces 111, the present invention is not limited thereto, and the two mounting units 120 may be disposed to be positioned on different side surfaces of the first accommodation spaces 111.

That is, in the cup holder 100 according to one embodiment of the present invention, when the plurality of the first accommodation spaces 111 are provided and the mounting units 120 are disposed in the plurality of first accommodation spaces 111, the mounting units 120 disposed in the first accommodation spaces 111 may be provided to be rotated in different directions. In addition, in the cup holder 100 according to one embodiment of the present invention, the plurality of mounting units 120 may be installed in one first accommodation space 111 so as to be rotatable in different directions.

The sensing unit 140 or 240 may detect an input signal of a user or may detect proximity of the portable terminal 10. Here, the input signal of the user may be a user's movement or a user's touch operation with respect to the sensing unit 140 or 240.

Thus, the driving unit 150 may rotate the mounting unit 120 based on a signal detected by the sensing unit 140 or 240 to shift the mounting unit 120 from the standby position to the charging position, and the user may press the portable terminal 10 against one surface of the mounting unit 120 shifted to the charging position to charge the battery of the portable terminal 10 using wireless power transmitted from the first wireless power transmission module 130.

As an example, the sensing unit 140 may be a proximity sensor capable of detecting a user's movement or a touch sensor capable of detecting a user's touch, and the sensing unit 140 may be electrically connected to the circuit board 160.

Accordingly, when a user's movement is detected at a distance close to the sensing unit 140 or a part of a user's body touches the sensing unit 140, the mounting unit 120 may be shifted from the standby position to the charging position through the operation of the driving unit 150.

In this case, the sensing unit 140 may be provided in the housing 110 so as to be positioned outside the first accommodation space 111. As a non-limiting example, as shown in FIGS. 1 to 5, the sensing unit 140 may be coupled to the housing 110 through a holder member 114 of which a lower portion is open, and the holder member 114 may be disposed to be positioned outside the first accommodation space 111. In addition, the sensing unit 140 may be disposed to not be positioned directly over the mounting unit 120.

Thus, in the cup holder 100 according to one embodiment of the present invention, it is possible to prevent the sensing unit 140 from detecting an input signal of a user in a process in which the user inserts an object into the first accommodation space 111.

For this reason, in the cup holder 100 according to one embodiment of the present invention, since the sensing unit 140 can react only to an accurate input signal in accord with the user's intention, the mounting unit 120 can be prevented from being shifted from the standby position to the charging position regardless of the user's intention.

For another example, the sensing unit 240 may be a near field communication (NFC) antenna capable of recognizing an NFC signal transmitted from the portable terminal 10.

In this case, as shown in FIG. 13, the sensing unit 240 may be embedded in the mounting unit 120, and the sensing unit 240 shown in FIG. 13 may replace the sensing unit 140 shown in FIGS. 1 to 9.

That is, the sensing unit 240 may include an NFC antenna 242 and an NFC driving chip 241 so as to recognize an NFC signal transmitted from the portable terminal 10, and the NFC antenna 242 and the NFC driving chip 241 may be embedded in the mounting unit 120.

Accordingly, when the portable terminal 10 approaches the mounting unit 120, the sensing unit 240 may recognize an NFC signal transmitted from the portable terminal 10 through the NFC antenna 242 and the NFC driving chip 241. When the sensing unit 240 recognizes the NFC signal transmitted from the portable terminal 10, the mounting unit 120 may be shifted from the standby position to the charging position through the operation of the driving unit 150.

Therefore, in the cup holder 100 according to one embodiment of the present invention, when an input signal in accord with the user's intention or proximity of the portable terminal 10 is detected through the sensing unit 240, the mounting unit 120 may be shifted from the standby position to the charging position. In addition, in the cup holder 100 according to one embodiment of the present invention, in a state in which the mounting unit 120 is shifted to the charging position, when the portable terminal 10 is mounted on one surface of the mounting unit 120, the battery of the portable terminal 10 can be easily charged using wireless power transmitted from the first wireless power transmission module 130 provided in the mounting unit 120.

In this case, in the cup holder 100 according to one embodiment of the present invention, only when the battery of the portable terminal 10 is bring charged, may the mounting unit 120 be maintained at the charging position.

That is, only when the mounting unit 120 is shifted to the charging position through the driving unit 150 based on a signal detected by the sensing unit 140 or 240 and the battery of the portable terminal 10 is being charged using wireless power transmitted from the first wireless power transmission module 130 provided in the mounting unit 120, may the mounting unit 120 be maintained at the charging position.

As an example, in a process in which the battery of the portable terminal 10 is disposed on one surface of the mounting unit 120 and is charged, when the user separates the portable terminal 10 from the mounting unit 120, the mounting unit 120 may be maintained at the charging position for a predetermined time and then may be shifted to the standby position.

In addition, even when the sensing unit 140 or 240 detect an input signal of a user or detect proximity of the portable terminal 10 to the mounting unit 120 regardless of the user's intention and thus the mounting unit 120 is shifted from the standby position to the charging position, the mounting unit 120 may be maintained at the charging position for a predetermined time and then may be shifted to the standby position.

That is, in the cup holder 100 according to one embodiment of the present invention, only when the battery of the portable terminal 10 is being charged in a state in which the portable terminal 10 is mounted on one surface of the mounting unit 120, may the mounting unit 120 be maintained at the charging position, and when the battery of the portable terminal 10 is not charged, the mounting unit 120 may be shifted to the standby position.

Accordingly, since the mounting unit 120 is always maintained at the standby position in a non-charging state in which the battery of the portable terminal 10 is not charged, the cup holder 100 according to one embodiment of the present invention can maintain a state in which other objects can be accommodated in the first accommodating space 111.

The driving unit 150 may provide a driving force to the rotation shafts 126 and 127 such that the mounting unit 120 is rotatable in the first accommodation space 111.

Thus, as shown in FIGS. 14A-14B, the mounting unit 120 may be shifted between the charging position and the standby position through driving of the driving unit 150 or may maintain the charging position or the standby position.

That is, the driving unit 150 may provide or block a rotational force to the first rotation shaft 125 and the second rotation shaft 126 to shift the mounting unit 120 between the charging position and the standby position or maintain the mounting unit 120 in a state of being positioned at the charging position or the standby position.

The driving unit 150 may be operated based on a signal detected by the sensing unit 140 or 240, thereby shifting the mounting unit 120 between the charging position and the standby position or maintaining the mounting unit 120 in a state of being positioned at the charging position or the standby position.

Figure 8:
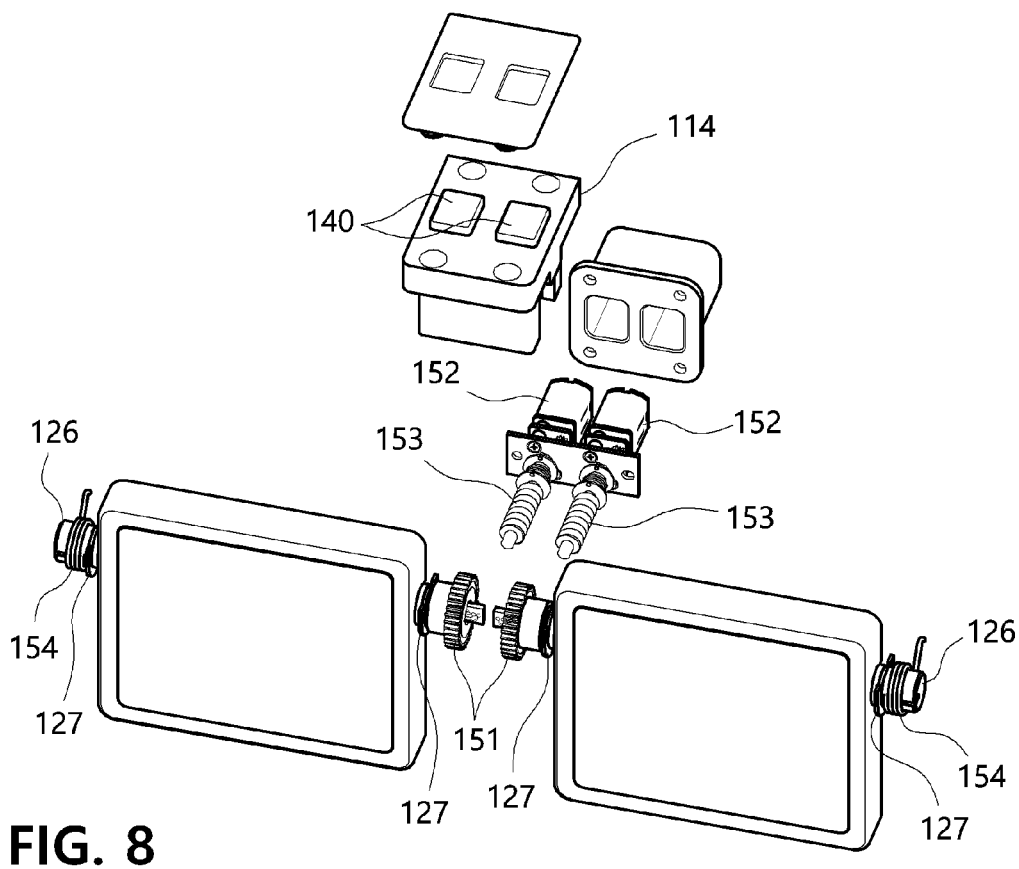
FIG. 8 is an exploded view of FIG. 7.
Figure 10:
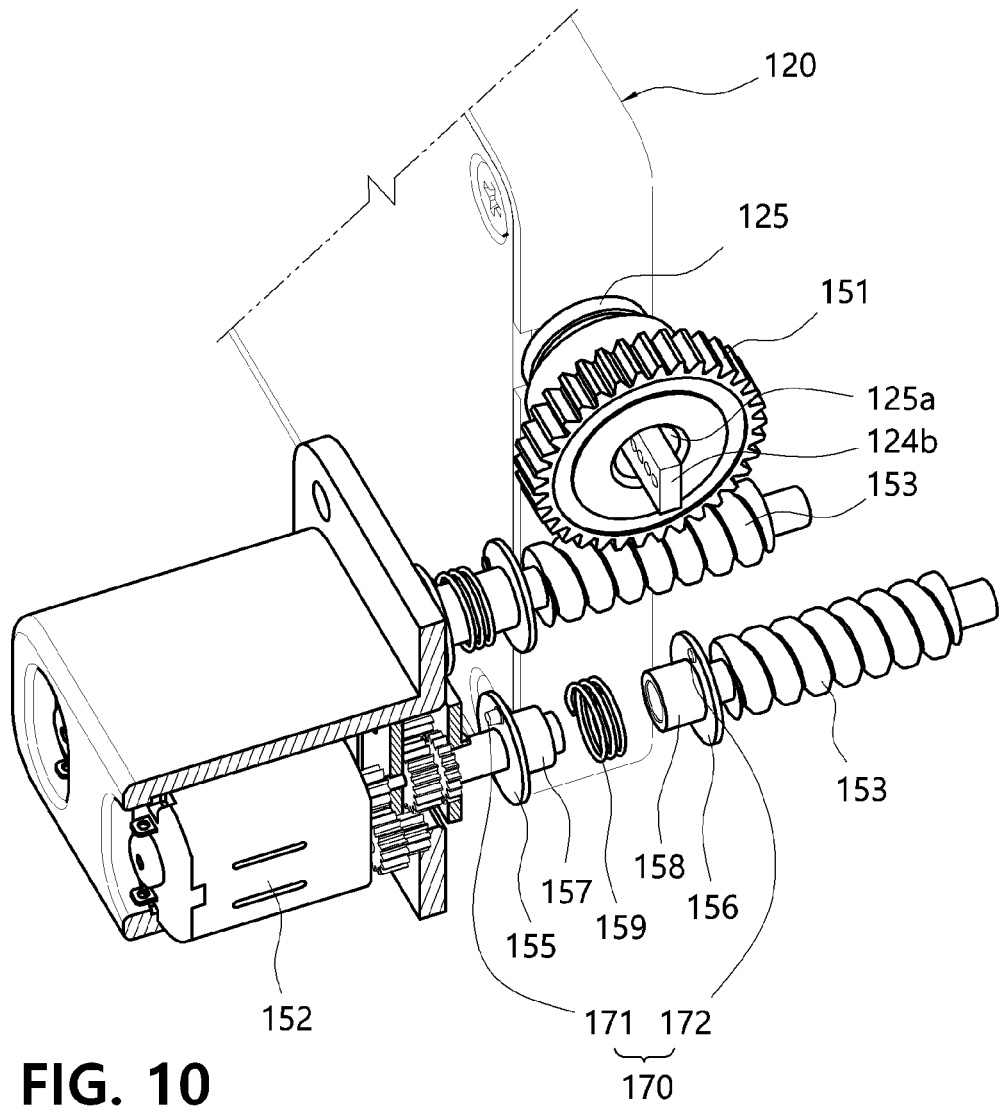
FIG. 10 is a view illustrating a coupling relationship between the driving unit and a malfunction sensing unit in the vehicle cup holder allowing wireless charging according to one embodiment of the present invention.
Figure 11A:
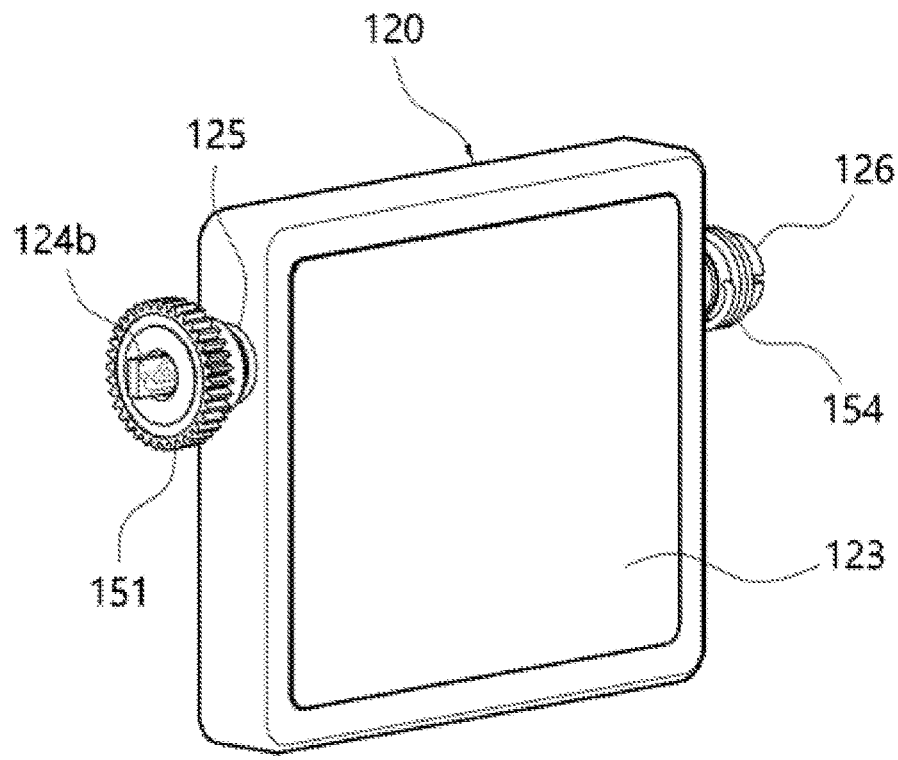
FIGS. 11A-11B show the mounting unit extracted from the vehicle cup holder allowing wireless charging according to one embodiment of the present invention.
Figure 11B:
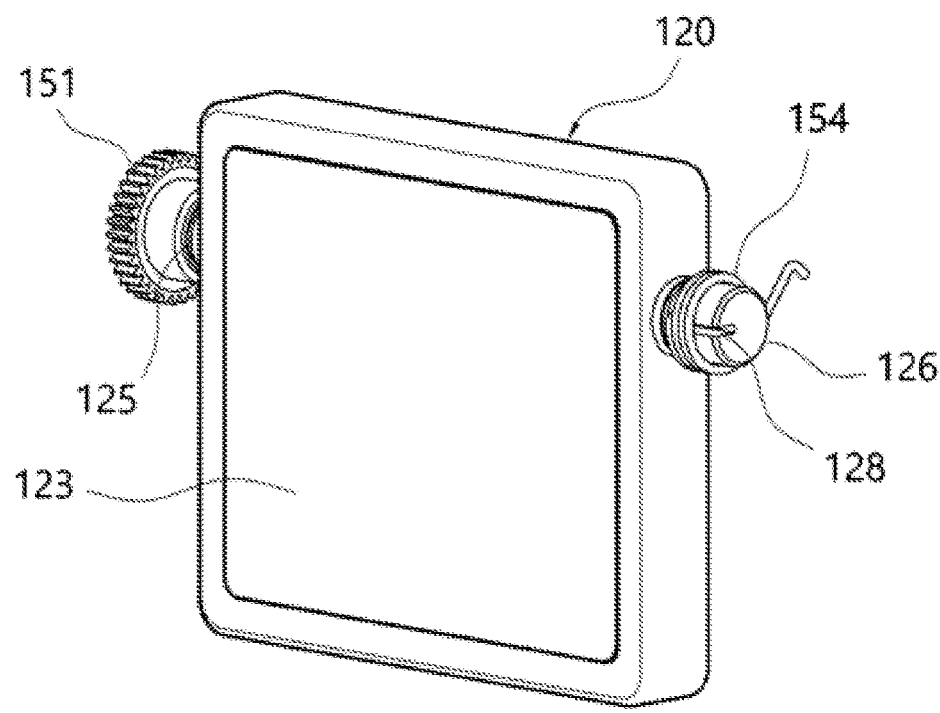

To this end, as shown in FIGS. 8 to 10, the driving unit 150 may include a driven gear 151 axially coupled to the first rotation shaft 125, a driving motor 152 mounted at one side of the housing 110, and a drive gear 153 axially coupled to the driving motor 152 and engaged with the driven gear 151.

As a non-limiting example, the driven gear 151 may be a worm wheel, and the drive gear 153 may be a worm. However, the driven gear 151 and the drive gear 153 are not limited thereto, and as long as it is possible to transmit driving of a motor as in a bevel gear, a helical gear, a rack, and a pinion gear, all of various known types of gears may be applied.

Accordingly, in the cup holder 100 according to one embodiment of the present invention, when the sensing unit 140 or 240 detects an input signal of the user or detect proximity of the portable terminal 10 to the mounting unit 120, the first rotation shaft 125 may be rotated through driving of the driving unit 150 so that the mounting unit 120 may be shifted from the standby position to the charging position.

In addition, in the cup holder 100 according to one embodiment of the present invention, when the battery of the portable terminal 10 is not charged in the mounting unit 120, the first rotation shaft 125 may be rotated through driving of the driving unit 150 so that the mounting unit 120 may be shifted from the charging position to the standby position.

Accordingly, the cup holder 100 according to one embodiment of the present invention may smoothly perform both the first function as a cup holder of accommodating an object such as a cup or a tumbler and the second function as a wireless charger of charging a battery of a portable terminal.

In the present invention, the driving units 150 may be provided to correspond to the mounting units 120, respectively.

In addition, when the plurality of first accommodation spaces 111 are formed in the housing 110, the driving unit 150 may also be provided to correspond to the first accommodation spaces 111 as well as the mounting units disposed in the first accommodation spaces, respectively.

Figure 7:
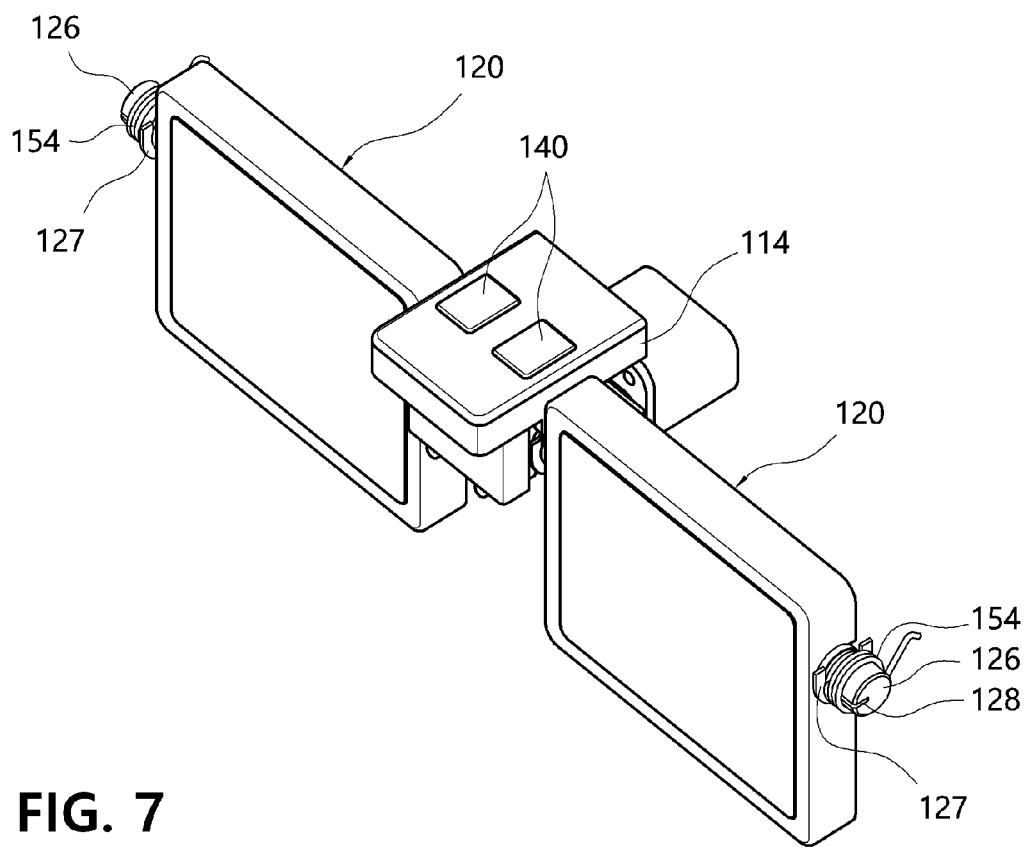
FIG. 7 is a view of a mounting unit, a rotation shaft, a sensing unit, and a driving unit which are extracted in FIG. 1.

In addition, as shown in FIG. 7, the cup holder 100 according to one embodiment of the present invention may include a torsion spring 154 coupled to the second rotation shaft 126.

Here, the torsion spring 154 may provide an elastic force to rotate the second rotation shaft 126 in one direction. That is, the torsion spring 154 may provide an elastic force to rotate the mounting unit 120 in a direction away from the side surface of the first accommodation space 111. To this end, one end portion of the torsion spring 154 may be fitted into a fitting groove 128 formed to be cut in an end portion of the second rotation shaft 126, and the opposite other end portion thereof may be supported on one side of the housing 110.

Thus, when the first rotation shaft 125 is rotated through a driving force provided from the driving unit 150 and the mounting unit 120 is shifted from the standby position to the charging position, the mounting unit 120 may be stably rotated through the elastic force provided from the torsion spring 154 together with the driving force provided from the driving unit 150, and the second rotation shaft 126 may be stably supported through the torsion spring 154 in a state in which the mounting unit 120 is shifted to the charging position.

Meanwhile, in the cup holder 100 according to one embodiment of the present invention, it is possible to prevent the mounting unit 120 from being shifted to the charging position in a state in which an object is accommodated in the first accommodation space 111.

That is, in the cup holder 100 according to one embodiment of the present invention, in a process in which the mounting unit 120 is shifted from the standby position to the charging position based on a signal detected by the sensing unit 140 or 240, when it is determined that an object is accommodated in the first accommodation space 111, the mounting unit 120 may not be completely shifted from the standby position to the charging position and may be shifted back to the standby position.

As an example, the mounting unit 120 may change a rotation direction of the driving motor 152 based on an amount of a current applied to the driving motor 152.

Specifically, when the sensing unit 140 or 240 detects an input signal of a user or detect proximity of the portable terminal 10 to the mounting unit 120 in a state in which an object is accommodated in the first accommodation space 111, the mounting unit 120 may be rotated to be shifted from the standby position to the charging position through driving of the driving unit 150.

In this case, in a process in which the mounting unit 120 is rotated from the standby position to the charging position, the rotation of the mounting unit 120 is restricted by the object accommodated in the first accommodation space 111, but since the mounting unit 120 is in a state of being not completely rotated to the charging position, the driving motor 152 continuously provides a driving force. Accordingly, an overcurrent may be applied to the driving motor 152.

In this case, the controller mounted on the circuit board 160 determines that the object is accommodated in the first accommodation space 111 and drives the driving motor 152 to change the rotation direction of the driving motor 152 into a reverse direction, thereby returning the mounting unit 120 to the standby position.

Therefore, in the cup holder 100 according to one embodiment of the present invention, when an object is accommodated in the first accommodation space 111, it is possible to prevent the mounting unit 120 from being completely shifted to the charging position, thereby returning the mounting unit 120 to the standby position.

For another example, the cup holder 100 according to one embodiment of the present invention may further include a malfunction prevention unit 170 to prevent the mounting unit 120 from being shifted to the charging position in a state in which an object is accommodated in the first accommodation space 111.

That is, the malfunction prevention unit 170 may include a Hall sensor 171 and a magnet member 172 as shown in FIG. 10, and the malfunction prevention unit 170 may be provided in the driving unit 150.

Thus, when the Hall sensor 171 and the magnet member 172 are not aligned in a process in which the driving unit 150 is operated, the malfunction prevention unit 170 may determine that an object is accommodated in the first accommodation space 111, thereby preventing the mounting unit 120 from being completely shifted to the charging position.

Specifically, the driving unit 150 may further include a first member 155 axially coupled to a rotation shaft of the driving motor 152, a second member 156 axially coupled to the drive gear 153 and having an opposite surface facing the first member 155, one pair of joint members 157 and 158 disposed between the first member 155 and the second member 156, and a spring member 159 having both end portions fixed to the one pair of joint members 157 and 158.

In this case, the one pair of joint members 157 and 158 may include a first joint member 157 axially coupled to the rotation shaft of the driving motor 152 and a second joint member 158 axially coupled to the drive gear 153. The first joint member 157 may be rotatably coupled to the second joint member 158, and the spring member 159 may be disposed to surround circumferential surfaces of the first joint member 157 and the second joint member 158.

Here, the first member 155 and the first joint member 157 may be formed as separate members or may be integrally formed. Similarly, the second member 156 and the second joint member 158 may be formed as separate members or may be integrally formed.

In addition, the Hall sensor 171 may be mounted on one surface of the first member 155, the magnet member 172 may be mounted on one surface of the second member 156, and the Hall sensor 171 and the magnet member 172 may be disposed at positions facing each other.

Thus, when the driving motor 152 is operated, the first member 155 and the first joint member 157 may be rotated in the same direction as a rotation direction of the rotation shaft of the driving motor 152. A driving force may be transmitted through the spring member 159 connecting the first joint member 157 and the second joint member 158, and thus, the second member 156 axially coupled to the second joint member 158 and the drive gear 153 may also be rotated in the same direction as the rotation direction of the rotation shaft of the driving motor 152.

Accordingly, in a state in which an object is not accommodated in the first accommodation space 111, the mounting unit 120 may be rotated through the operation of the driving unit 150 and freely shifted between the charging position and the standby position. In addition, the Hall sensor 171 and the magnet member 172 may maintain an alignment state in which the Hall sensor 171 and the magnet member 172 face each other.

In this case, when an external force acts on the mounting unit 120 in a process in which the mounting unit 120 is rotated from the standby position to the charging position, the Hall sensor 171 and the magnet member 172 may be shifted from the alignment state in which the Hall sensor 171 and the magnet member 172 face each other to an unalignment state in which positions thereof are misaligned.

That is, as shown in FIG. 15A, in a state in which an object is accommodated in the first accommodation space 111, when the mounting unit 120 is rotated from the standby position to the charging position, one side of the mounting unit 120 may come into contact with the object so that an external force may act on the mounting unit 120.

Thus, the rotation of the mounting unit 120 may be restricted by the object accommodated in the first accommodation space 111.

In this case, as shown in FIG. 15B, the rotation of the driven gear 151 axially coupled to the first rotation shaft 125 is restricted by the external force applied to the mounting unit 120, and thus, the rotation of the drive gear 153 engaged with the driven gear 151 may also be restricted. Accordingly, the rotation of the second member 156 axially coupled to the drive gear 153 and the first joint member 157 may also be restricted.

However, since the first joint member 157 is connected to the second joint member 158 through the spring member 159, the first member 155 axially coupled to the rotation shaft of the driving motor 152 and the first joint member 157 may be rotated together with the rotation shaft of the driving motor 152.

Accordingly, since the first member 155 is rotated together with the rotation shaft of the driving motor 152 and the second member 156 is not rotated, the Hall sensor 171 mounted on one surface of the first member 155 and the magnet member 172 mounted on one surface of the second member 156 to face the Hall sensor 171 may be shifted from the alignment state in which the Hall sensor 171 and the magnet member 172 face each other to the unalignment state in which positions thereof are misaligned.

Thus, the Hall sensor 171 may detect that the position of the magnet member 172 is changed, and the controller mounted on the circuit board 160 may determine that an object is accommodated in the first accommodation space 111 based on a signal detected by the Hall sensor 171, thereby driving the driving motor 152 to change the rotation direction of the driving motor 152 into a reverse direction.

Accordingly, as shown in FIG. 15C, the first member 155 and the first joint member 157 may be rotated in the same direction as the rotation direction of the rotation shaft of the driving motor 152. A driving force may be transmitted through the spring member 159 connecting the first joint member 157 and the second joint member 158, and thus, the second member 156 axially coupled to the second joint member 158 and the drive gear 153 may also be rotated in the same direction as the rotation direction of the rotation shaft of the driving motor 152.

Accordingly, the rotation direction of the mounting unit 120 may be changed into a reverse direction, and thus, the mounting unit 120 may return to the standby position.

Therefore, in the cup holder 100 according to one embodiment of the present invention, when an object is accommodated in the first accommodation space 111, it is possible to prevent the mounting unit 120 from being completely shifted to the charging position, thereby returning the mounting unit 120 to the standby position.

Meanwhile, the cup holder 100 according to one embodiment of the present invention may further include second wireless power transmission modules 180. The second wireless power transmission module 180 may be disposed at a position corresponding to the bottom surface of the first accommodation space 111.

That is, the second wireless power transmission module 180 may be embedded in the bottom surface of the first accommodation space 111.

Figure 5:
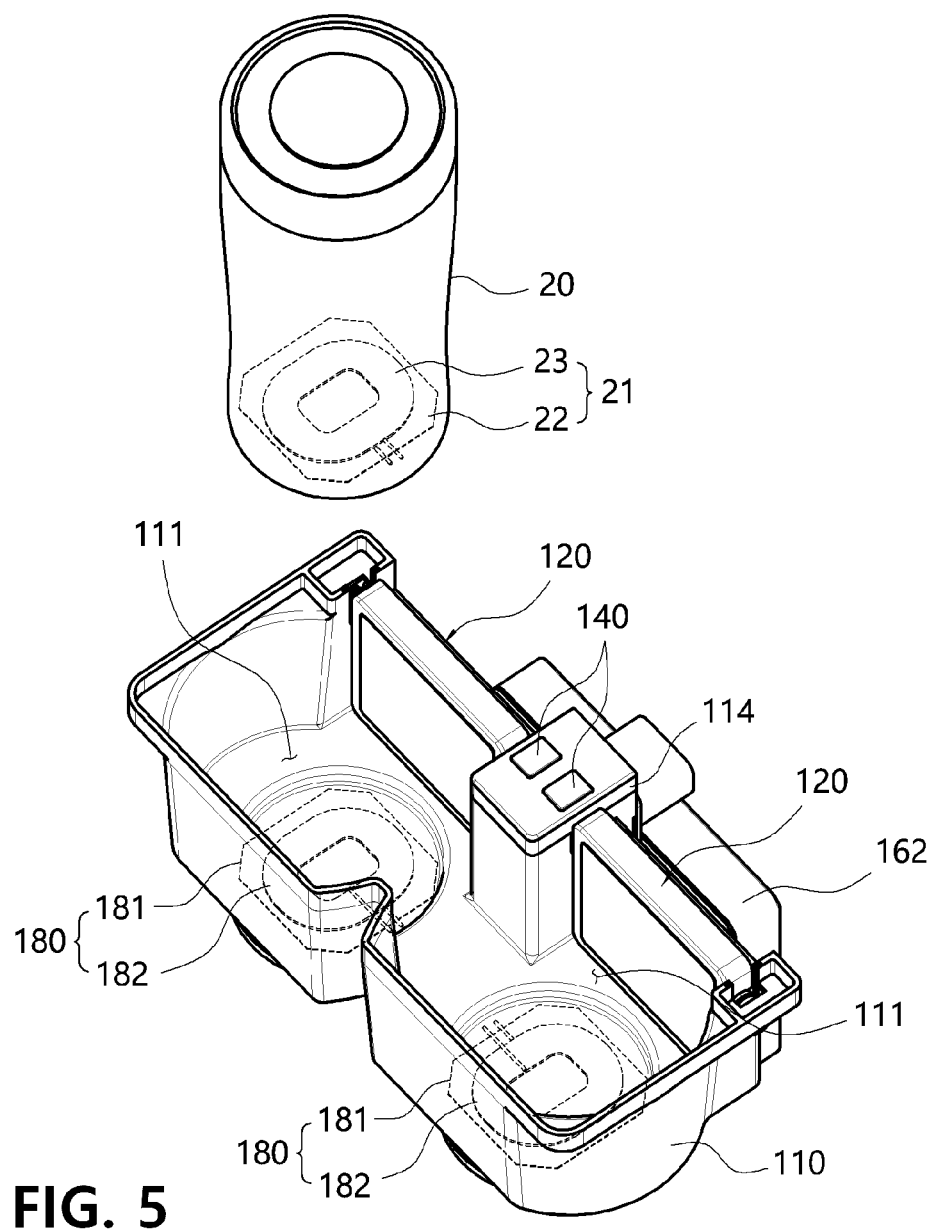
FIG. 5 is a view illustrating a state in which a wireless power transmission module is embedded in a bottom surface of an accommodation space in FIG. 1.

As an example, as shown in FIG. 5, the second wireless power transmission module 180 may be embedded in a lower surface of the housing 110.

Figure 6:
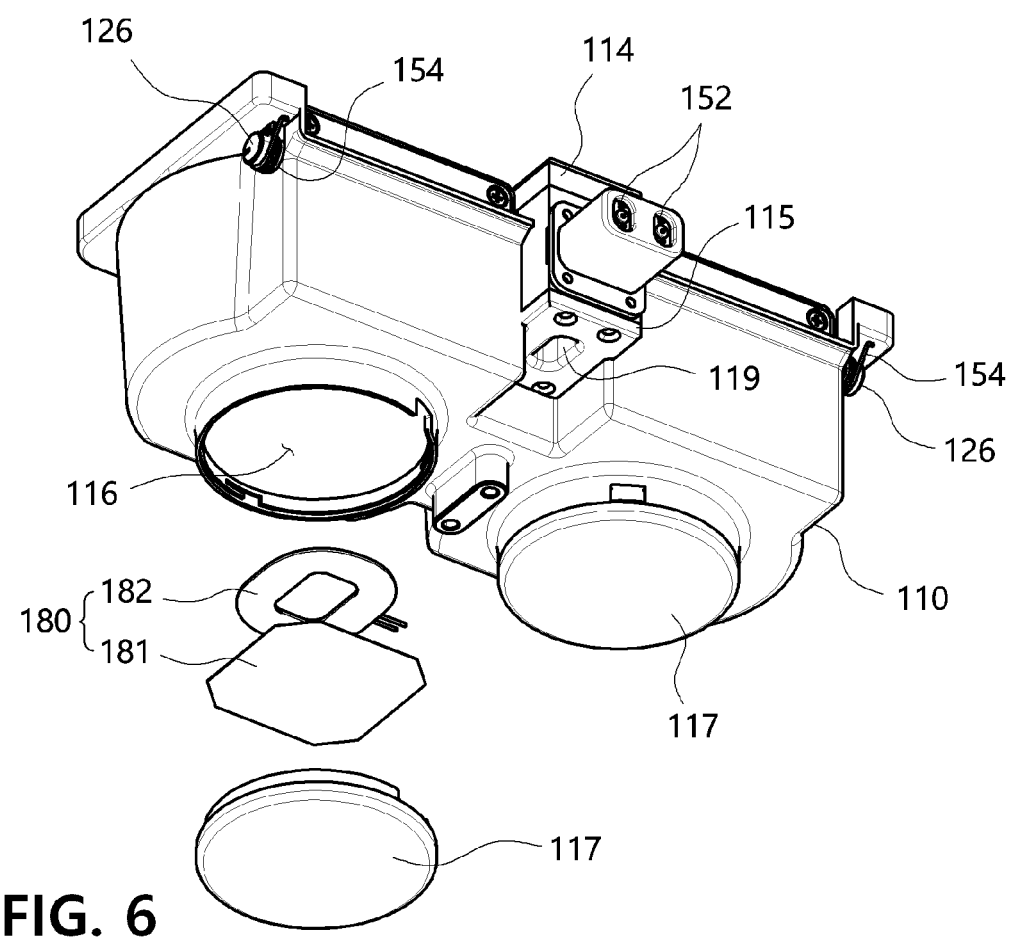
FIG. 6 is a view in which a cap member is separated in FIG. 5.

To this end, as shown in FIG. 6, the housing 110 may have a second accommodation space 116 for accommodating the second wireless power transmission module 180, which is formed in the lower surface of the housing 110 corresponding to the bottom surface of the first accommodation space 111.

In addition, the second accommodation space 116 may have a lower portion formed to be open such that the second wireless power transmission module 180 may be inserted therein, and the open lower portion of the second accommodation space 116 may be sealed through a cap member 117 detachably coupled to the housing 110.

When an object capable of receiving wireless power is accommodated in the first accommodation space 111 in a state in which the mounting unit 120 is disposed at the standby position, the second wireless power transmission module 180 may transmit wireless power to the object.

As an example, when a cup having a function of heating contents by wirelessly receiving power is accommodated in the first accommodation space 111, the cup may receive power from the second wireless power transmission module 180 to heat the contents.

As a non-limiting example, the cup may be a known wireless heating tumbler, and as shown in FIG. 5, the wireless heating tumbler may include a wireless power reception module 21 capable of receiving power from the second wireless power transmission module 180.

Here, similar to the first wireless power transmission module 130 embedded in the mounting unit 120, the second wireless power transmission module 180 may include a shielding sheet 181 and a wireless power transmission antenna 182 and may be electrically connected to the circuit board 160.

In addition, the wireless power reception module 21 may include a shielding sheet 22 and a wireless power transmission antenna 23 disposed on one surface of the shielding sheet 22.

Thus, the cup holder 100 according to one embodiment of the present invention may wirelessly charge a battery of a portable terminal through the first wireless power transmission module 130 and may supply power to the wireless heating tumbler accommodated in the first accommodation space 111 through the second wireless power transmission module 180.

In addition, various control circuits for controlling the first wireless power transmission module 130 and the second wireless power transmission module 180 may be mounted on the circuit board 160.

Meanwhile, the first wireless power transmission module 130 may be electrically connected to the circuit board 160 through a connection board 124 embedded in the mounting unit 120.

In this case, as shown in FIG. 3, the connection board 124 may be provided such that a portion thereof is exposed inside the holder member 114 through the second rotation shaft 126.

As an example, the second rotation shaft 126 may include a first through-hole 125*a* formed to pass therethrough in a length direction thereof, and the connection board 124 may include a first part 124*a* embedded in the mounting unit 120 and a second part 124*b* disposed to extend from the first part 124*a* and to pass through the first through-hole 125*a*. A partial length of the second part 124*b* may pass through the first through-hole 125*a* and then protrude outward from an end portion of the second rotation shaft 126.

In this case, both end portions of the wireless power transmission antenna 132 may be connected to the first part 124*a* of the connection board 124, and as shown in FIG. 3, end portions of cables C may be connected to the second part 124*b* of the connection board 124.

In this case, as shown in FIG. 6, a fixing member 115 having second through-holes 119, through which the cables C may pass, formed therein may be coupled to one side of the housing 110. The fixing member 115 may be disposed to be positioned below the holder member 114.

Accordingly, the cable C for electrically connecting the circuit board 160 and the connection board 124 may pass through the second through-hole 119 and then may be smoothly connected to the second part 124*b* of the connection board 124 protruding inside the holder member 114.

Thus, the connection board 124 may be electrically connected to the circuit board 160 through the cable C.

For this reason, in the cup holder 100 according to one embodiment of the present invention, even when the second rotation shaft 126 is rotated, the connection board 124 may be smoothly connected to the circuit board 160 through the cable C regardless of the rotational movement of the second rotation shaft 126, and the possibility for the cable C to be disconnected can be significantly reduced.

In addition, the cup holder 100 according to one embodiment of the present invention may facilitate a wiring operation of the cable C for electrically connecting the circuit board 160 and the first wireless power transmission module 130.

The cup holder 100 according to one embodiment of the present invention described above may be installed inside a vehicle.

Figure 16:
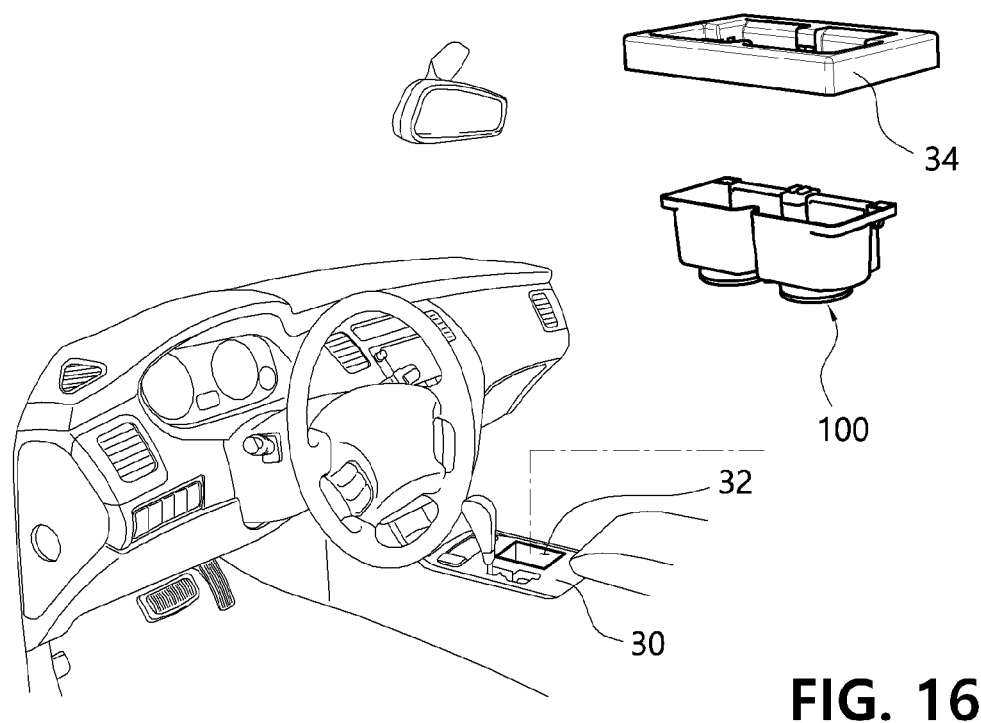
FIG. 16 is a view illustrating a state in which the vehicle cup holder allowing wireless charging according to one embodiment of the present invention is installed in a console box of a vehicle.

As an example, as shown in FIG. 16, the cup holder 100 according to one embodiment of the present invention may be installed in a console box 30 of a vehicle.

That is, as shown in FIG. 16, the console box 30 of the vehicle may have a mounting space 32, in which the cup holder 100 according to one embodiment of the present invention may be accommodated, formed therein, and a cover member 34 for covering the mounting space 32 may be coupled to an upper side of the console box 30.

Accordingly, the cup holder 100 may be insertion-disposed in the mounting space 32 in a state in which one side thereof is fixed to the cover member 34. In this case, the cover 162 in which the circuit board 160 is embedded may also be fixed to the cover member 34, and the circuit board 160 may be electrically connected to a battery of the vehicle.

For this reason, the cup holder 100 according to one embodiment of the present invention can replace a conventional cup holder installed in the known console box 30.

However, the mounting method and mounting position of the cup holder 100 according to one embodiment of the present invention are not limited thereto, and the cup holder 100 may be installed in various positions other than the above-described console box as long as the cup holder 100 is disposed inside the vehicle.

While the embodiments of the present invention have been described above, the present invention is not limited to the embodiment presented herein. One skilled in the art may easily suggest other embodiments due to addition, modification, deletion, and the like of components within the scope and spirit of the present invention, and the addition, modification, deletion, and the like of the components fall within the scope and spirit of the present invention.

The invention claimed is:

1. A vehicle cup holder allowing wireless charging, comprising:
   a housing which has an accommodation space, in which an object including a portable terminal is accommodated, formed therein;
   a mounting unit which is coupled to the housing through a rotation shaft so as to be rotatable in the accommodation space and which includes a wireless power transmission module configured to wirelessly charge a battery of the portable terminal;
   a sensing unit which detects an input signal of a user or detects proximity of the portable terminal; and
   a driving unit which provides a driving force to the rotation shaft based on a signal detected by the sensing unit such that the mounting unit is shifted to a charging position at which the battery of the portable terminal is charged or a standby position at which the object is accommodated in the accommodation space.

2. The vehicle cup holder of claim 1, wherein the charging position is a position at which one surface of the mounting unit is disposed to be inclined at an acute angle with respect to a bottom surface or a side surface of the accommodation space so as to support one surface of the portable terminal, and
   the standby position is a position at which the one surface of the mounting unit is disposed in a state parallel to the side surface of the accommodation space.

3. The cup vehicle holder of claim 1, wherein the sensing unit is a proximity sensor configured to detect a user's movement or a touch sensor configured to detect a user's touch.

4. The vehicle cup holder of claim 3, wherein the sensing unit is disposed in the housing so as to be positioned outside the accommodation space.

5. The vehicle cup holder of claim 1, wherein the sensing unit is a near field communication (NFC) antenna embedded in the mounting unit to recognize an NFC signal transmitted from the portable terminal.

6. The vehicle cup holder of claim 1, wherein the rotation shaft includes a first rotation shaft and a second rotation shaft which protrude outward from both sides of the mounting unit by a predetermined length, and the driving unit includes a driven gear axially coupled to the first rotation shaft, a driving motor mounted in the housing, and a drive gear axially coupled to the driving motor and engaged with the driven gear.

7. The vehicle cup holder of claim 6, further comprising a malfunction prevention unit configured to shift the mounting unit to the standby position by detecting a state in which the object is accommodated in the accommodation space when the mounting unit is rotated from the standby position to the charging position.

8. The vehicle cup holder of claim 7, wherein the driving unit further includes a first member axially coupled to a rotation shaft of the driving motor, a second member axially coupled to the drive gear and having an opposite surface facing the first member, a first joint member disposed between the first member and the second member and axially coupled to the rotation shaft of the driving motor, a second joint member disposed between the first member and the second member and axially coupled to the drive gear, and a spring member of which one end portion is fixed to the first joint member, and the other end portion is fixed to the second joint member, and which is disposed to surround circumferential surfaces of the first joint member and the second joint member, and the malfunction prevention unit includes a Hall sensor mounted on one surface of the first member and a magnet member mounted on one surface of the second member.

9. The vehicle cup holder of claim 1, wherein the mounting unit includes a case having an interior space in which the wireless power transmission module is disposed, and a connection board disposed in the interior space and electrically connected to the wireless power transmission module, the rotation shaft has a through-hole formed to pass therethrough in a length direction thereof, and the connection board includes a first part disposed in the interior space and a second part disposed to pass through the through-hole such that a portion thereof is exposed to the outside and a cable is connected thereto.

10. The vehicle cup holder of claim 9, wherein the mounting unit includes at least one protrusion protruding from an inner surface of the case so as to support one surface of the wireless power transmission module.

11. The vehicle cup holder of claim 1, further comprising another wireless power transmission module embedded in a bottom surface of the accommodation space, wherein, in a state in which the mounting unit maintains the standby position, the another wireless power transmission module transmits wireless power to the object inserted into the accommodation space.

* * * * *